H. W. BARLOW.
Horse-Powers.

No. 149,972. Patented April 21, 1874.

Witnesses:
H. A. Daniels
Will. H. Morow

Inventor:
Hosea W. Barlow
by A. N. & R. K. Evans
attys.

UNITED STATES PATENT OFFICE.

HOSEA W. BARLOW, OF WYATTVILLE, MINNESOTA.

IMPROVEMENT IN HORSE-POWERS.

Specification forming part of Letters Patent No. 149,972, dated April 21, 1874; application filed March 31, 1874

*To all whom it may concern:*

Be it known that I, HOSEA W. BARLOW, of Wyattville, in the county of Winona and State of Minnesota, have invented certain new and useful Improvements in Horse-Power Levers; and I do hereby declare the following to be a full, clear, and exact description of the invention, such as will enable others skilled in the art to which it pertains to make and use it, reference being had to the accompanying drawings, which form part of this specification.

Figure 1:
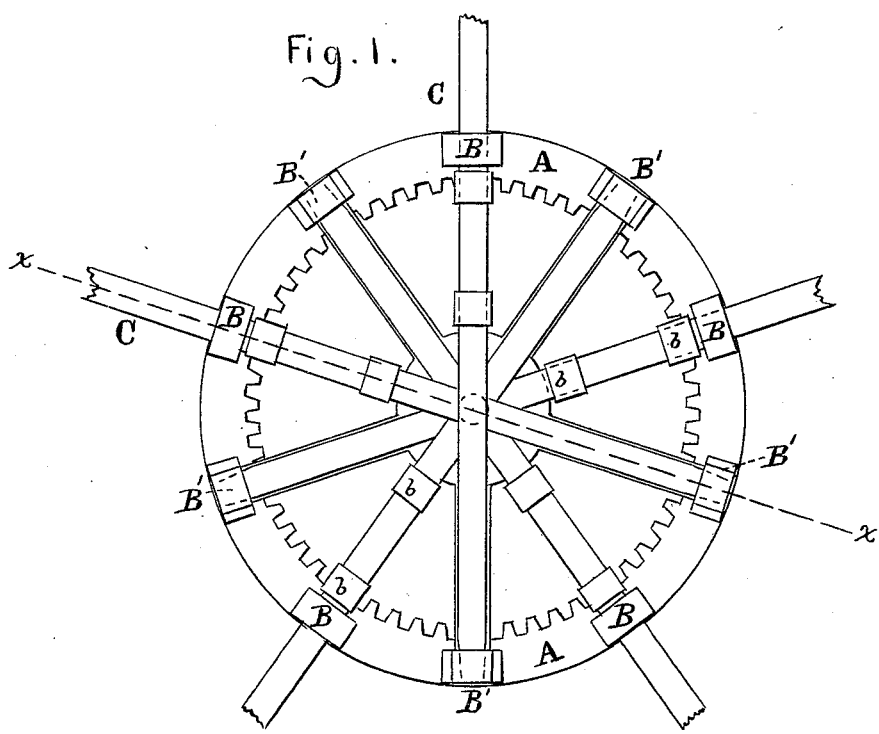
Figure 2:
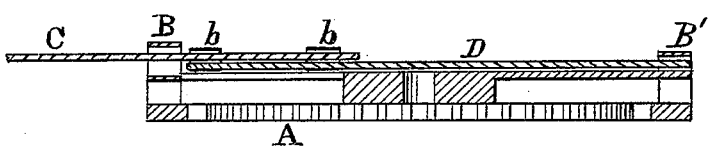

Figure 1 is a plan view of a wheel through which the power of the horse-power is applied, showing a plan of the levers. Fig. 2 is a sectional view on the line $x\ x$, of Fig. 1.

The object of my invention is to produce for horse-powers a lever that will give great power, and at the same time combine the easiest and most convenient form for transportation. My invention consists in an arrangement of pairs of eyes or sockets, one opposite the other, around the edge of the larger gear or power-wheel, and passing from one to the other are certain spliced levers, which in detail more especially constitute my invention.

In order that those skilled in the art may make and use my invention, I will proceed to describe the manner in which I have carried it out.

In the said drawings, A is the power-wheel of a horse-power, having arranged around its edge a series of sockets B B'. D D are a series of pieces about the circumference of the wheel A, and having at one end the loops $b\ b$ with a small space between them. The extension-pieces C C are so arranged and constructed as to fit through the sockets B B' and into the loops $b\ b$. The ends of the pieces D D opposite from the loops fit into the sockets B'.

The advantages of my construction are as follows: I am enabled to extend the lever across the driving-wheel, so as to make it of the most powerful character, and at the same time be able to take it apart, so as to avoid trouble in transportation. The construction also allows the length of the lever to be adjusted, which on many occasions is important.

I am aware that levers for horse-powers have been made removable, and have also been made hinged, so as to economize space in transportation. Neither of these do I claim; but

Having thus described my invention, what I claim as new and desire to secure by Letters Patent, is—

The bars C and bars D with the loops $b\ b$, in combination with the wheel A with its sockets B B', all constructed and operated as and for the purpose set forth.

In testimony that I claim the foregoing I have hereunto set my hand this 14th day of March, 1874.

HOSEA W. BARLOW.

Witnesses:
    WM. B. PHELPS,
    ABNER LEWIS.